(12) United States Patent
Staude et al.

(10) Patent No.: US 11,372,471 B2
(45) Date of Patent: Jun. 28, 2022

(54) SYSTEM CIRCUIT BOARD, OPERATING METHOD FOR A SYSTEM CIRCUIT BOARD, AND COMPUTER SYSTEM

(71) Applicant: Fujitsu Technology Solutions Intellectual Property GmbH, Munich (DE)

(72) Inventors: Rainer Staude, Munich (DE); Rudolf Häußermann, Munich (DE); Waldemar Felde, Munich (DE); Andreas Maier, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 438 days.

(21) Appl. No.: 16/400,134

(22) Filed: May 1, 2019

(65) Prior Publication Data
US 2019/0346910 A1  Nov. 14, 2019

(30) Foreign Application Priority Data

May 8, 2018 (DE) .................... 10 2018 111 052.9
May 24, 2018 (DE) .................... 10 2018 112 489.9

(51) Int. Cl.
| | | |
|---|---|---|
| *G06F 1/26* | (2006.01) | |
| *G06F 1/3287* | (2019.01) | |
| *G06F 1/18* | (2006.01) | |
| *G06F 1/3296* | (2019.01) | |

(52) U.S. Cl.
CPC ............ *G06F 1/3287* (2013.01); *G06F 1/185* (2013.01); *G06F 1/263* (2013.01); *G06F 1/3296* (2013.01)

(58) Field of Classification Search
CPC . G06F 1/185; G06F 1/26; G06F 1/263; G06F 1/3287; G06F 1/3296; G01R 19/16542; G01R 31/3648
See application file for complete search history.

(56) References Cited

U.S. PATENT DOCUMENTS

| | | |
|---|---|---|
| 5,996,035 A | 11/1999 | Allen et al. |
| 6,339,340 B1 | 1/2002 | Hsu |
| (Continued) | | |

OTHER PUBLICATIONS

PCI Express® 225 W/300 W High Power Card Electromechanical Specification, Revision 1.0, Mar. 27, 2008.
(Continued)

*Primary Examiner* — Jaweed A Abbaszadeh
*Assistant Examiner* — Brian J Corcoran
(74) *Attorney, Agent, or Firm* — DLA Piper LLP (US)

(57) ABSTRACT

A system circuit board configured to be supplied by at least one power supply unit, with an operating voltage in an operating state and a stand-by voltage in at least one stand-by state, the system circuit board includes at least one connection device for at least one extension card, wherein the connection device is configured to provide at least one first card voltage on the basis of the operating voltage; at least one switching element arranged on the system circuit board and configured to disconnect the at least one connection device from the operating voltage; and a control device arranged on the system circuit board, and configured to identify a type of a connected power supply unit and send a switching signal to the switching element depending on the identified type.

9 Claims, 3 Drawing Sheets

(56) References Cited

U.S. PATENT DOCUMENTS

| | | | | |
|---|---|---|---|---|
| 6,775,784 B1* | 8/2004 | Park | .................... | G06F 1/3287 |
| | | | | 713/320 |
| 7,734,953 B1* | 6/2010 | Sivertsen | ............ | G06F 11/2015 |
| | | | | 714/14 |
| 2002/0099965 A1 | 7/2002 | Yang | | |
| 2008/0082840 A1* | 4/2008 | Kendall | ................ | G06F 1/3253 |
| | | | | 713/300 |
| 2009/0172429 A1* | 7/2009 | Rachakonda | ......... | G06F 1/3203 |
| | | | | 713/310 |
| 2009/0313494 A1* | 12/2009 | Wang | ........................ | G06F 1/26 |
| | | | | 713/340 |
| 2011/0307732 A1* | 12/2011 | Furusho | ................ | H02J 7/0068 |
| | | | | 713/340 |
| 2014/0115348 A1 | 4/2014 | Sun | | |
| 2015/0106638 A1 | 4/2015 | Sun et al. | | |

OTHER PUBLICATIONS

Combined Search and Examination Report dated Jul. 12, 2019 of counterpart GB Application No. GB1901337.4.

* cited by examiner

SYSTEM CIRCUIT BOARD, OPERATING METHOD FOR A SYSTEM CIRCUIT BOARD, AND COMPUTER SYSTEM

TECHNICAL FIELD

This disclosure relates to a system circuit board configured to be supplied by at least one power supply unit, with an operating voltage in an operating state and with a stand-by voltage in at least one stand-by state, as well as an operating method for a system circuit board, and a computer system.

BACKGROUND

System circuit boards are supplied by at least one power supply unit, with an operating voltage in an operating state and with a stand-by voltage in at least one stand-by state are known. For this purpose, power supply units are often used which comprise a main power supply that provides the operating voltage and an auxiliary power supply that provides the stand-by voltage. Since power supply units dissipate ever smaller amounts of dissipation power, it is now also possible to use a power supply unit comprising just one overall power supply that provides both the operating voltage and the stand-by voltage.

SUMMARY

We provide a system circuit board configured to be supplied by at least one power supply unit, with an operating voltage in an operating state and a stand-by voltage in at least one stand-by state, the system circuit board including at least one connection device for at least one extension card, wherein the connection device is configured to provide at least one first card voltage on the basis of the operating voltage; at least one switching element arranged on the system circuit board and configured to disconnect the at least one connection device from the operating voltage; and a control device arranged on the system circuit board, and configured to identify a type of a connected power supply unit and send a switching signal to the switching element depending on the identified type.

We also provide a method of operating a system circuit board supplied by at least one power supply unit, with an operating voltage in an operating state and with a stand-by voltage in at least one stand-by state, the system circuit board including at least one connection device for at least one extension card, at least one switching element arranged on the system circuit board and configured to disconnect the at least one connection device from the operating voltage, and a control device arranged on the system circuit board, the method including providing at least one first card voltage on the basis of the operating voltage, at the at least one connection device; identifying by the control device a type of a connected power supply unit; and sending by the control device a switching signal to the at least one switching element, depending on the identified type.

We further provide a computer system including the system circuit board configured to be supplied by at least one power supply unit, with an operating voltage in an operating state and a stand-by voltage in at least one stand-by state, the system circuit board including at least one connection device for at least one extension card, wherein the connection device is configured to provide at least one first card voltage on the basis of the operating voltage; at least one switching element arranged on the system circuit board and configured to disconnect the at least one connection device from the operating voltage; and a control device arranged on the system circuit board, and configured to identify a type of a connected power supply unit and send a switching signal to the switching element depending on the identified type, at least one power supply unit to provide the operating voltage and the stand-by voltage, and at least one extension card connected to the connection device and configured to be supplied with power by the at least one first card voltage.

LIST OF REFERENCE CHARACTERS 1, 1' arrangement
2, 2' computer power supply unit
3, 3' system circuit board
4, 4' extension card
5$a$-5$e$ pin
5$a'$-5$f'$ pin
6$a$-6$e$ line
6$a'$-6$f'$ line
7, 7' first plug-in connector
8, 8' second plug-in connector
9, 9' control module
10, 10' switching element
11' third plug-in connector
$U_B$ operating voltage
$U_S$ stand-by voltage
PWROK PWR-OK signal
PSOFF PS-OFF signal
GND ground potential
$U_{K1}$ first card voltage
$U_{K2}$ second card voltage
S switching signal
$t_1$-$t_6$ time
$t_1'$-$t_6'$ time
X operating state
Y stand-by state

DETAILED DESCRIPTION

We provide a system circuit board configured to be supplied by at least one power supply unit with an operating voltage in an operating state and with a stand-by voltage in at least one stand-by state. The system circuit board comprises at least one connection device for at least one extension card, wherein the connection device is configured to provide at least one first card voltage, on the basis of the operating voltage. The system circuit board furthermore comprises at least one switching element arranged on the system circuit board and designed to disconnect the at least one connection device from the operating voltage. A control device is furthermore arranged on the system circuit board, wherein the control device is configured to identify a type of a connected power supply unit and send a switching signal to the switching element depending on the identified type.

An advantage is that the system circuit board is suitable for optionally being operated using different power supply units. For example, a power supply unit can be used that comprises a main power supply to provide an operating voltage and an auxiliary power supply to provide a stand-by voltage, or a power supply unit can be used that comprises an overall power supply to provide the operating voltage and the stand-by voltage. It is therefore not necessary to manufacture differently designed system circuit boards for each item, thereby simplifying production of a computer system. The switching element makes it possible to disconnect the at least one first card voltage when the system circuit board is operated in at least one stand-by state in which the system circuit board is supplied with the stand-by voltage. Switching processes of the switching element can be carried out in different manners by the control device, depending on what type of power supply unit was identified. For example, a time at which the switching signal is sent to the switching element may depend on what type was identified.

The control device may be designed as a sequencing device to sequence voltages provided by the power supply unit. An advantage is that a sequencing device of this kind is present on the system circuit board. This way, the control logic provided to sequence the voltages is sufficient with respect to the control of the switching element and identification of the type of the power supply unit. Accordingly, no additional control modules are required to control the system circuit board described herein.

The sequencing device may be configured to identify the type of a power supply unit on the basis of an evaluation of a signal curve of a first control signal that indicates that all the voltages made available by the power supply unit are within a specified tolerance, and a second control signal that signals a switch from the at least one stand-by state to the operating state or vice versa. Signals of this kind are processed by the sequencing device. The type of the power supply unit can thus be determined on the basis of signals from the sequencing device that are already present.

The control device may be further configured to store the identified type of the power supply unit. It is advantageous, for example, to determine the type of the power supply unit when the voltage supply of the system circuit board is switched on. The identified type is then stored for it to be possible to control subsequent switching processes of the switching element on the basis of the stored identified type without being necessary to identify the type of the power supply unit again. For example, the stored type can be taken into account for a switching process of the switching element when switching from the operating state into the at least one stand-by state.

We also provide an operating method for a system circuit board configured to be supplied by at least one power supply unit with an operating voltage in an operating state and with a stand-by voltage in at least one stand-by state. The system circuit board comprises at least one connection device for at least one extension card, at least one switching element arranged on the system circuit board and is configured to disconnect the at least one connection device from the operating voltage, and a control device arranged on the system circuit board. The operating method comprises the steps of:

providing at least one first card voltage, on the basis of the operating voltage, at the at least one connection device;

identifying, by the control device, a type of a connected power supply unit; and sending, by the control device, a switching signal to the at least one switching element, depending on the identified type.

We further provide a computer system comprising a system circuit board. The computer system further comprises at least one power supply unit to provide the operating voltage and the stand-by voltage, and at least one extension card connected to the connection device and is configured to be supplied by the at least one first card voltage.

Further advantages are described in the appended claims and in the following description of the drawings. In the drawings, elements having substantially the same function are provided with the same reference characters, although the elements need not be identical in all particularities. Furthermore, in the drawings, different instances of similar components are denoted by alphabetic suffixes.

Figure 1:
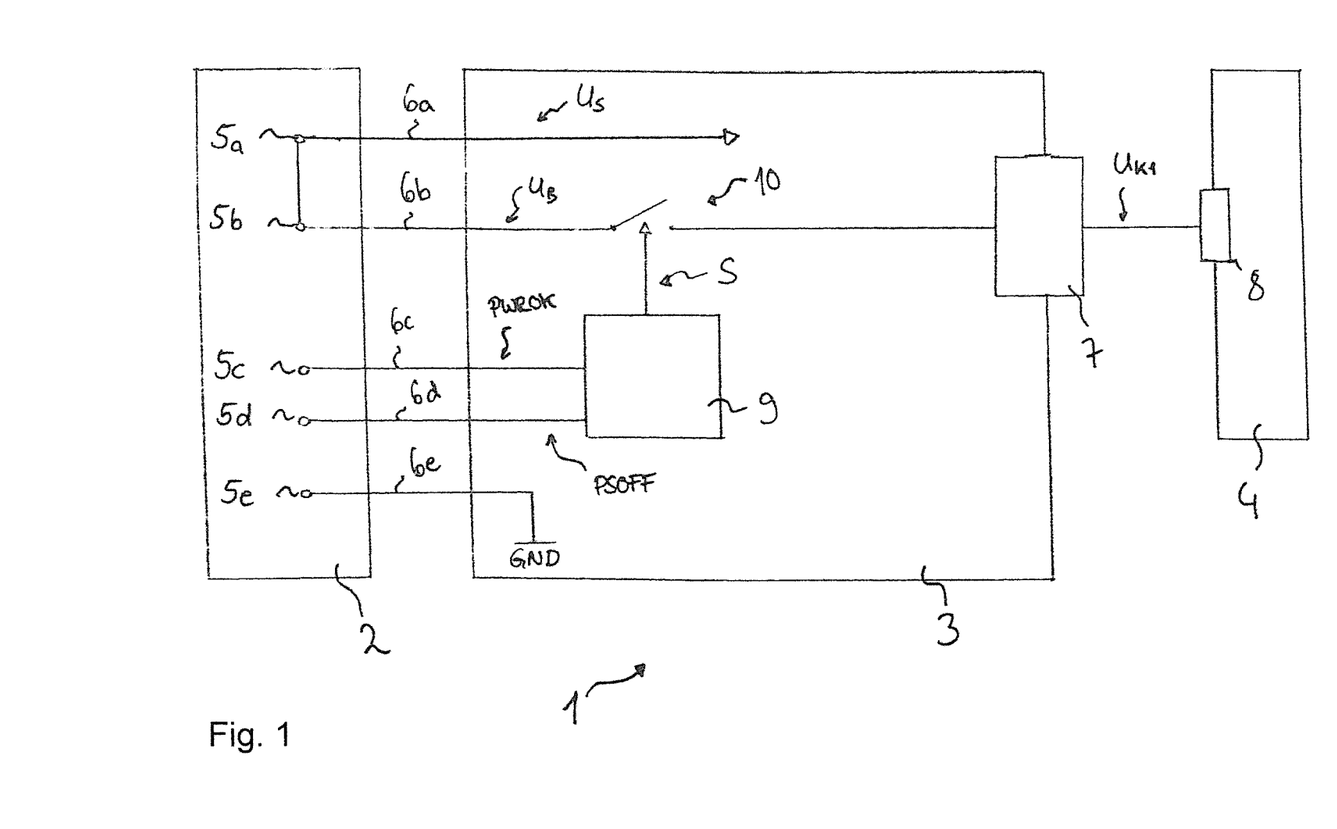
FIG. 1 is a schematic view of an arrangement according to an example in a first configuration.
Figure 2:
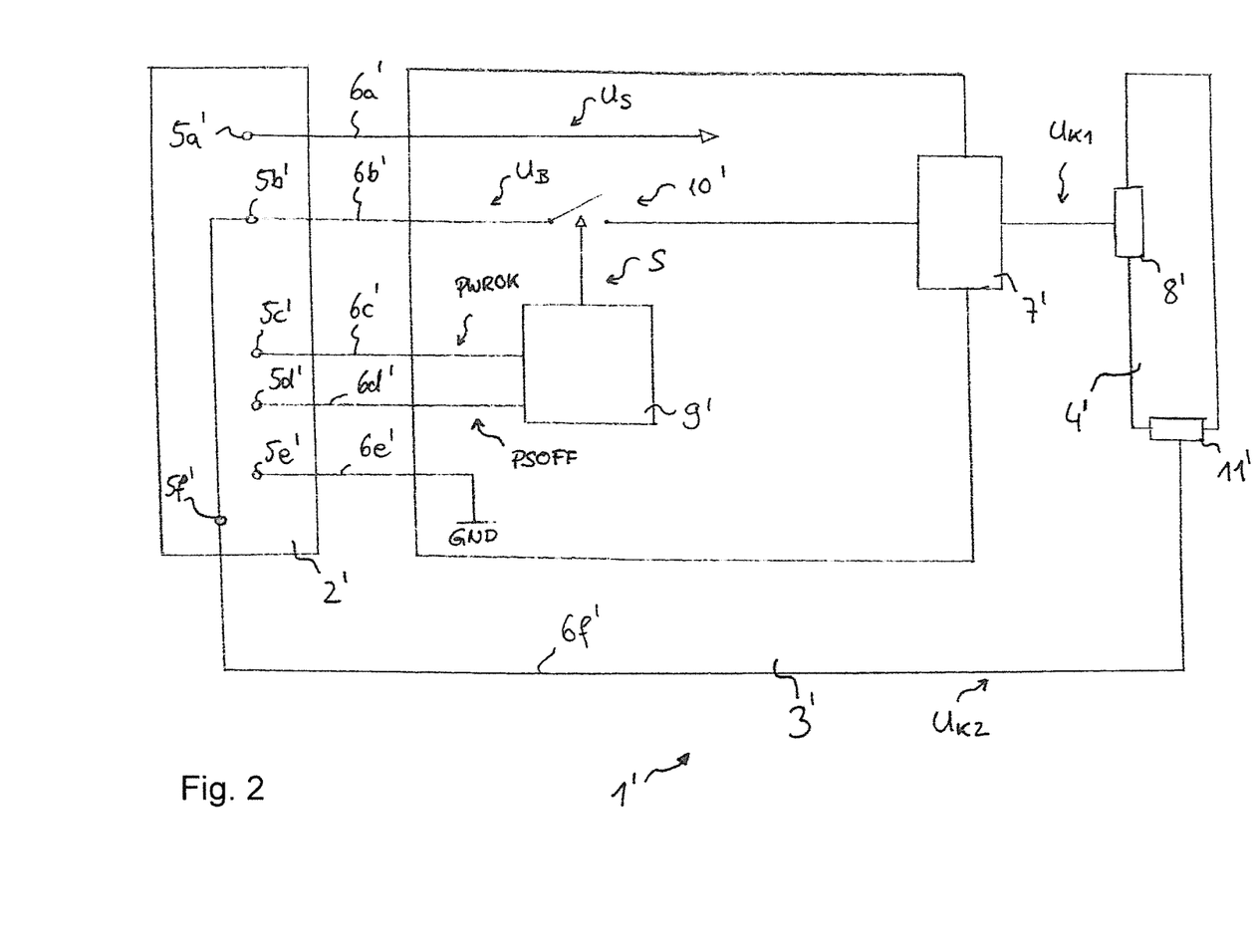
FIG. 2 is a schematic view of the arrangement according to the example according to FIG. 1 in a second configuration.

FIG. 1 is a schematic view of an arrangement 1 comprising a computer power supply unit 2, a system circuit board 3, and an extension card 4. FIG. 2 is a schematic illustration of an arrangement 1' comprising a system circuit board 3', as well as a computer power supply unit 2' and an extension card 4'. The arrangements 1, 1' are, for example, each part of a computer system, a sever, a laptop, a tablet computer, or another electronic device. The computer power supply units 2, 2' are, for example, internal power supply units or external power supply units. The system circuit boards 3, 3' are designed identically in both of FIGS. 1 and 2, and constitute, for example, a motherboard or another board by which the extension cards can be connected to a computer system. In this example, the extension cards 4, 4' are PCIe cards, but may also be any other extension cards connected to a system circuit board in a computer system.

The arrangements 1, 1' may each be operated in an operating state X or in a stand-by state Y. In the operating state X, the arrangements 1, 1' are, for example, in an ACPI S0 state in which the computer systems in which the arrangements 1, 1' are used are fully functional. In the operating state X, the computer power supply units 2, 2' provide an operating voltage $U_B$ at the system circuit boards 3, 3'. Via the system circuit boards 3, 3' the extension cards 4, 4 are supplied with a first card voltage $U_{K1}$, on the basis of the operating voltage $U_B$. In the operating state X, the computer power supply unit 2' according to FIG. 2 additionally provides a second card voltage $U_{K2}$ of 12 V directly at the computer power supply unit 2'. The operating voltage $U_B$ and the second card voltage $U_{K2}$ are provided by the computer power supply unit 2' in a synchronized manner. The computer power supply unit 2 according to FIG. 1 does not provide the second card voltage $U_{K2}$.

In the stand-by state Y, the arrangements 1, 1' are, for example, in one of the ACPI power saving states S3 to S5 in which parts of computer systems in which the arrangements 1, 1' are used are disconnected, but the computer power supply units 2, 2' are connected to a voltage source. In the stand-by state Y, the computer power supply units 2, 2' provide a stand-by voltage $U_S$ at the system circuit boards 3, 3' by which voltage components not shown here are supplied with power in the stand-by state. In the operating state X, the computer power supply units 2, 2' provide higher power for the arrangements 1, 1' than in the stand-by state Y.

According to FIG. 2, the computer power supply unit 2' comprises a main power supply (not shown here) to provide the operating voltage $U_B$ and the second card voltage $U_{K2}$, and an auxiliary power supply (not shown here) to provide the stand-by voltage $U_S$. The main power supply is more efficient at a power level to be delivered in the operating state X. In contrast, the auxiliary power supply is more efficient at a power level to be delivered in the stand-by state Y. Since, according to FIG. 2, the operating voltage $U_B$ and the stand-by voltage $U_S$ are switched by different power supplies, the two voltages $U_B$, $U_S$ are independent of one another and provided by the computer power supply unit 2' in an asynchronous manner. The computer power supply unit 2' disconnects the operating voltage $U_B$ in the stand-by state Y.

According to FIG. 1, the computer power supply unit 2 comprises an overall power supply (not shown here) to provide both the operating voltage $U_B$ and the stand-by voltage $U_S$. The overall power supply dissipates less dissipation power both at a power provided for an operating state X and at a power provided for the stand-by state Y. Since, according to FIG. 1, the operating voltage $U_B$ and the stand-by voltage $U_S$ are provided by an overall power supply, the two voltages $U_B$, $U_S$ are coupled to one another and provided at the system circuit board 3 in a synchronized manner. The computer power supply unit 2 of the arrangement 1 thus provides both the operating voltage $U_B$ and the stand-by voltage $U_S$, both in the operating state X and in the stand-by state Y.

According to both FIGS. 1 and 2, the system circuit boards 3, 3' each comprise a first plug-in connector 7, 7'. The extension cards 4, 4' each comprise a second plug-in connector 8, 8'. The first plug-in connectors 7, 7' and the second plug-in connectors 8, 8' are, for example, designed such that the second plug-in connectors 8, 8' can be plugged into the first plug-in connectors 7, 7' to establish a mechanical and electrical connection between the respective extension cards 4, 4' and the system circuit boards 3, 3'. Alternatively, the first plug-in connectors 7, 7' and the second plug-in connectors 8, 8' are designed such that they can each be electrically interconnected by at least one cable. The connections between the first plug-in connectors 7, 7' and the respective second plug-in connector 8, 8' is used to provide the first card voltage $U_{K1}$, at a level of 12 V, for the respective extension card 4, 4'. In addition, further voltages (not shown here) for the extension card 4, 4', for example, an additional 3.3 V card operating voltage in the operating state X and a 3.3 V card stand-by voltage in the stand-by state Y, and data, can also be exchanged between the extension card 4, 4' and the system circuit boards 3, 3' by the connection. The additional 3.3 V card operating voltage is controlled by further switching elements (not shown here).

The computer power supply units 2, 2' comprise a plurality of pins 5, 5', to which lines 6, 6' are connected via which voltages can be provided and data signals can be exchanged between the respective computer power supply unit 2, 2' and the corresponding system circuit boards 3, 3'. Just a few of such pins of a computer power supply unit are shown in FIGS. 1 and 2. In reality, computer power supply units of this kind comprise significantly more pins of this kind. The description of the pins 5, 5' and the lines 6, 6' is purely by way of example. The connections between the computer power supply units 2, 2' and the system circuit boards 3, 3' can of course also be designed in a different manner. For example, the system circuit boards 3, 3' alternatively or in addition comprise a plug, via which the system circuit boards 3, 3' are connected to the computer power supply units 2, 2' and comprises pins corresponding to the pins 5, 5'. The computer power supply units 2, 2' can, for example, also be directly plugged onto the system circuit boards 3, 3'.

The stand-by voltage $U_S$ by which the system circuit board 3 is supplied with power in the stand-by state Y via a first line 6a, 6a' is each provided at a first pin 5a, 5a' of the computer power supply units 2, 2'. In this example, the stand-by voltage $U_S$ is 12 V. The operating voltage $U_B$, which is also 12 V, is each provided at one second pin 5b, 5b' of the computer power supply units 2, 2'. In the operating state X, the operating voltage $U_B$ is provided at the system circuit board 3, 3' via a second line 6b, 6b'.

Each of a third pin 5c, 5c' and a fourth pin 5d, 5d' of the computer power supply units 2, 2' are connected by a third line 6c, 6c' and a fourth line 6d, 6d', respectively, to control modules 9, 9' attached to the system circuit boards 3, 3'. The control modules 9, 9' are sequencing devices (in particular known as sequencing microcontrollers) that synchronize the voltages provided by the computer power supply units 2, 2', and comprise storage devices (not shown here). At the third pin 5c, 5c', a PWR-OK signal PWROK is each sent from the computer power supply units 2, 2' to the control modules 9, 9' as soon as all the voltages provided by the respective computer power supply unit 2, 2' are within a specified tolerance. At each of the fourth pin 5d, 5d', the computer power supply unit 2, 2' receives a PS-OFF signal PSOFF that signals a switch from the stand-by state Y into the operating state X or vice versa. The PWR-OK signal PWROK and the PS-OFF signal PSOFF are digital signals. The computer power supply units 2, 2' are each connected, via a fifth line 6e, 6e', to a ground potential GND of the system circuit board 3 by the fifth pin 5e, 5e'.

The second lines 6b, 6b' are electrically connected, on the system circuit boards 3, 3', to the first plug-in connectors 7, 7' such that the first card voltage $U_{K1}$ is provided at the first plug-in connectors 7, 7' on the basis of the operating voltage $U_B$. A switching element 10, 10' is each arranged on the system circuit boards 3, 3' by means of which switching element the first card voltage $U_{K1}$ can be isolated from the operating voltage $U_B$ such that the first card voltage $U_{K1}$ disconnects when the switching element 10, 10' is opened. The switching element 10, 10' is switched by a switching signal S generated by the control modules 9, 9' on the basis of the PWR-OK signal PWROK and the PS-OFF signal PSOFF. This will be described in more detail with reference to FIGS. 3 and 4.

The extension card 4' according to FIG. 2 comprises a third plug-in connector 11' in addition to the second plug-in connector 8', by which third plug-in connector the extension card 4' is supplied with the additional second card voltage $U_{K2}$ of 12 V directly from the computer power supply unit 2'. The additional second card voltage $U_{K2}$ is, for example, connected to an extension card 4' that draws a power of more than 75 W. For this purpose, the computer power supply unit 2' comprises a sixth pin 5f', from which a sixth line 6f' leads to the third plug-in connector 11'. The computer power supply unit 2', for example, also comprises the sixth pin 5f' if, as described above, the computer power supply unit 2' is plugged directly onto the system circuit board 3'. In this example, the lines 6a' to 6e' can be omitted, but the sixth line 6f' can still connect the sixth pin 5f' to the third plug-in connector 11'. The sixth line 6f' is not guided over the system circuit board 3, but rather past the system circuit board such that identical system circuit boards 3 can be used in the arrangement 1' according to FIG. 2 and in the arrangement 1 according to FIG. 1, irrespective of whether or not the extension cards 4, 4' are supplied with the second card voltage $U_{K2}$. In the computer power supply unit 2' according to FIG. 2, the sixth pin 5f' is coupled to the second pin 5b', at which the operating voltage $U_B$ is provided. The second card voltage $U_{K2}$ and the operating voltage $U_B$ are thus provided by the computer power supply unit 2' in a synchronized manner.

Figure 3:
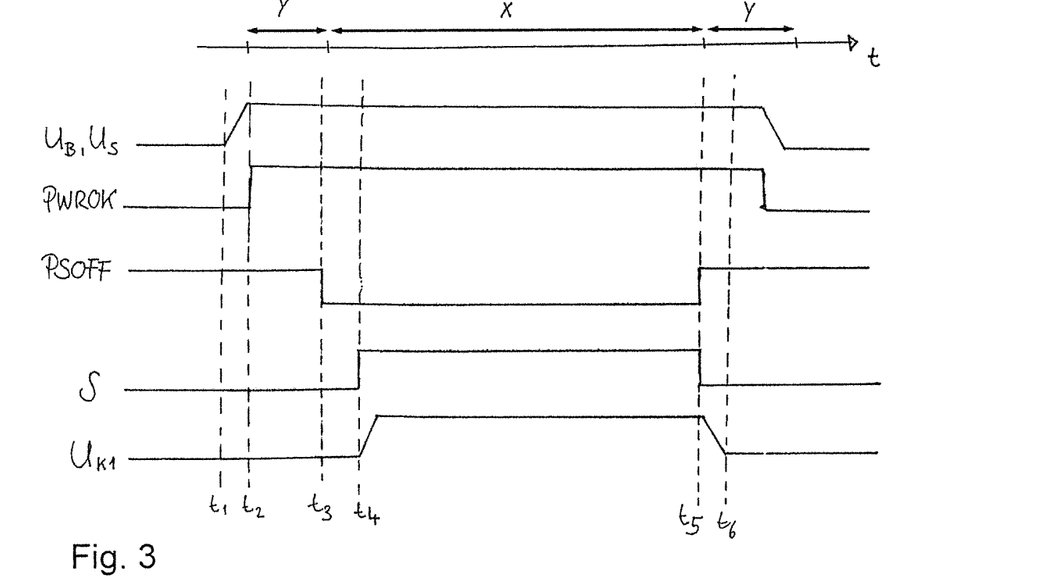
FIG. 3 schematically shows voltage and signal curves in the arrangement according to FIG. 1.
Figure 4:
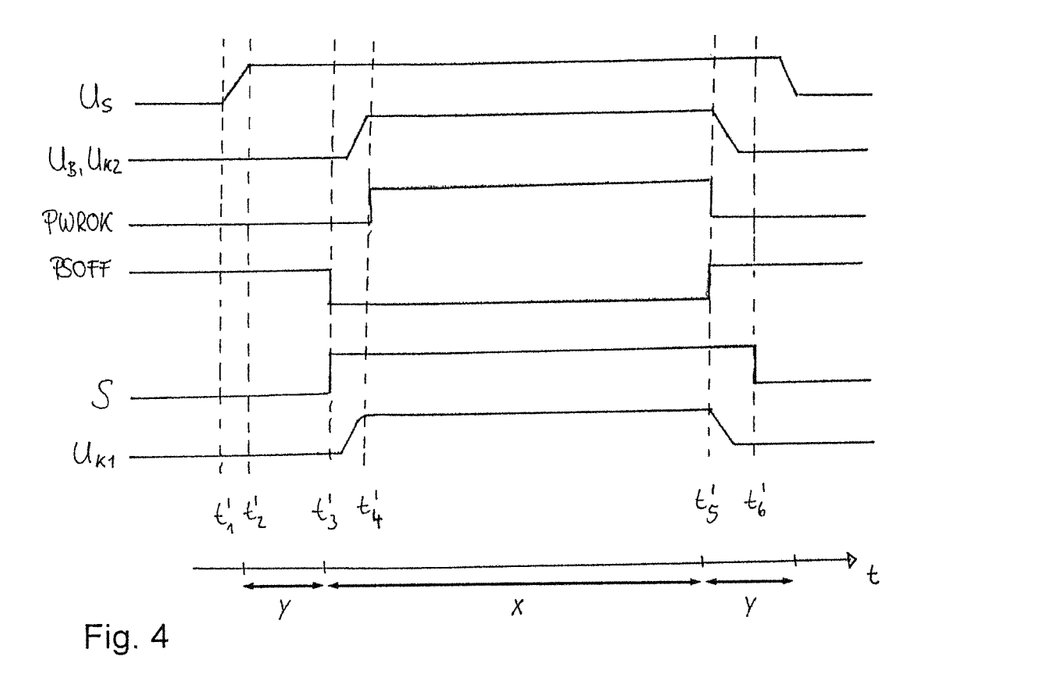
FIG. 4 schematically shows voltage and signal curves in the arrangement according to FIG. 2.

FIG. 3 schematically shows voltage and signal curves in the arrangement 1 according to FIG. 1 over time. FIG. 4 schematically shows voltage and signal curves in the arrangement 1' according to FIG. 2 over time. FIGS. 3 and 4 both show a signal curve of the PWR-OK signal PWROK and the PS-OFF signal PSOFF as well as of the switching signal S. Furthermore, FIGS. 3 and 4 both show a voltage curve of the first card voltage $U_{K1}$, the stand-by voltage $U_S$ and the operating voltage $U_B$. Since, as described with reference to FIG. 1, the stand-by voltage $U_S$ and the operating voltage $U_B$ are provided in a synchronous manner by an overall power supply in the arrangement 1 according to FIG. 1, FIG. 3 shows the two voltages $U_S$, $U_B$ combined in one graph. FIG. 4 additionally shows the curve of the second card voltage $U_{K2}$. Since, as described with reference to FIG. 2, the second card voltage $U_{K2}$ is coupled to the operating voltage $U_B$ in the arrangement 1' according to FIG. 2, FIG. 4 shows the two voltages $U_{K2}$, $U_B$ combined in one graph.

According to both FIGS. 3 and 4, the computer power supply unit 2 and the computer power supply unit 2', respectively, connect to a voltage source at a time $t_1$, $t_1'$. At the time $t_1$, $t_1'$, the PWR-OK signal PWROK and the switching signal S are at the logical switching state "low." Accordingly, at the time $t_1$, the PS-OFF signal PSOFF is at a logical switching state "high."

Until a time $t_2$, the stand-by voltage $U_S$ builds up to the target value of 12 V. Since, according to FIG. 1, the stand-by voltage $U_S$ and the operating voltage $U_B$ are coupled, according to FIG. 3 the operating voltage $U_B$ is also built up to the target value of 12 V until the time $t_2$. As a result, according to FIG. 3, at the time $t_2$ the operating voltage $U_B$ reaches a value within a specified tolerance, with the result that this is signaled by the computer power supply unit 2 by switching the PWR-OK signal PWROK from the logical switching state "low" to "high."

According to FIG. 2, the stand-by voltage $U_S$ and the operating voltage $U_B$ are independent of one another and, therefore, according to FIG. 4, the operating voltage $U_B$ is still disconnected and thus the PWR-OK signal PWROK remains at the logical switching state "low" until the time $t_2$. From the time $t_2$, $t_2'$ on, the arrangements 1, 1' are in the stand-by state Y.

According to FIGS. 3 and 4, the arrangements 1, 1' are switched into the operating state X at a time $t_3$, $t_3'$. This is signaled to the computer power supply units 2, 2' by switching the PS-OFF signal PSOFF to a logical switching state "low."

At the time $t_3$, $t_3'$, the control modules 9, 9' each determine a type of the computer power supply units 2, 2'. The control modules 9, 9' identify whether a computer power supply unit 2 of a first type, having an overall power supply, is installed in the arrangements 1, 1', which overall power supply supplies both the stand-by voltage $U_S$ and the operating voltage $U_B$ in a synchronized manner, or whether a computer power supply unit 2' of a second type, having an auxiliary power supply to provide the stand-by voltage $U_S$, and a main power supply to provide the operating voltage $U_B$ and the second card voltage $U_{K2}$, is installed in the arrangements. In the computer power supply unit 2' of the second type, the stand-by voltage $U_S$ and the operating voltage $U_B$ are provided in an asynchronous manner.

The control modules 9, 9' distinguish between the two types in that, according to the signal curve according to FIG. 3, in the arrangement 1 the PS-OFF signal PSOFF is switched to the logical switching state "low" at the time $t_3$, while the PWR-OK signal PWROK is already at the logical switching state "high." This signals a computer power supply unit 2 of the first type to the corresponding control module 9.

According to the signal curve according to FIG. 4, however, in the arrangement 1' the PS-OFF signal PSOFF is switched to the logical switching state "low" at the time $t_3'$, while the PWR-OK signal PWROK is still at the logical switching state "low" because, in the arrangement 1', the operating voltage $U_B$ has not yet built up at this time. This signals a computer power supply unit 2' of the second type to the control module 9. As an alternative to determining the type of the computer power supply units 2, 2' on the basis of the signals PSOFF and PWROK, it is also possible, for example, to take into account the voltage curves of the voltages $U_S$ and $U_B$ to determine the type of the computer power supply units 2, 2' in an analogous manner.

The identified type of the computer power supply unit 2, 2' is stored in the storage devices of the control modules 9, 9'. This identification is, for example, carried out each time the arrangement 1, 1' is switched from the stand-by state Y into the operating state X. Alternatively, this identification can also be carried out only if the computer power supply unit 2, 2' was previously disconnected from a voltage source and thus, for example, a memory in which the type was stored was cleared.

According to FIG. 4, i.e., in the arrangement 1' according to FIG. 2, when a computer power supply unit 2' of the second type is identified, at the time $t_3'$ the control module 9' also changes the switching signal S to a logical switching state "high" simultaneously with the PS-OFF signal PSOFF. As a result, the switching element 10' on the system circuit board 3' in the arrangement 1' is closed. The operating voltage $U_B$ which subsequently builds up until a time $t_4'$ is thus simultaneously made available to build up the first card voltage $U_{K1}$. At the time $t_4'$, according to FIG. 4 the operating voltage $U_B$ reaches a value within a specified tolerance, with the result that this is signaled by the computer power supply unit 2' by switching the PWR-OK signal PWROK from the logical switching state "low" to "high." Closing of the switching element 10' takes place at the same time as the switching of the PS-OFF signal PSOFF so that the first card voltage $U_{K1}$ and the second card voltage $U_{K2}$ can be built up synchronously. As a result, the arrangement 1' according to FIG. 2 complies with the PCI Express 225 W/300 W High Power Card Electromechanical Specification Revision 1.0 standard of 27 Mar. 2008, according to which the additional second card voltage $U_{K2}$ is permitted to deviate from the first card voltage $U_{K1}$ provided via the system circuit board 3 by at most 1.92 V.

According to FIG. 3, i.e., in the arrangement 1 according to FIG. 1, when a computer power supply unit 2 of the first type is identified, at a time $t_4$ the control module 9 changes the switching signal S at a time delay relative to the PS-OFF signal PSOFF to close the switching element 10. In this example, the time delay is approximately 25 ms and is provided for the computer power supply unit 2 to function, following the 25 ms, in a stable manner in an operating mode into which the computer power supply unit has been switched after the PS-OFF signal PSOFF has been received. Depending on a configuration of the computer power supply unit 2 of the first type, the time delay may also be longer or shorter or may be omitted entirely. Subsequently, according to FIG. 3 the first card voltage $U_{K1}$ is built up at the first plug-in connector 7 to supply voltage to the connected extension card 4. Devices (not shown here) are installed on the system circuit board 3, which devices prevent too rapid an increase in the first card voltage $U_{K1}$ after the switching element 10 is closed to prevent peaks in the first card voltage $U_{K1}$.

Also at the times $t_4$, $t_4'$, for example, the additional 3.3 V card operating voltage mentioned with reference to FIGS. 1 and 2, respectively, but is not shown here, is connected.

At a time $t_5$, according to FIGS. 3 and 4 the arrangements 1, 1' are switched from the operating state X into the stand-by state Y. For this purpose, the PS-OFF signal PSOFF is again switched to the logical switching state "high." According to FIG. 4, the operating voltage $U_B$ is thus disconnected in the arrangement 1' such that the logical switching state of the PWR-OK signal PWROK also changes to "low."

Depending on the previously identified and stored type of the computer power supply unit 2, 2', the switching signal S to open the switching element 10 is also changed.

According to FIG. 3, the switching signal S is switched to the logical switching state "low" and the switching element 10 is opened, at the same time as the PS-OFF signal PSOFF is switched, at time $t_5$ such that the first card voltage $U_{K1}$ drops back to zero by a time $t_6$. As a result, in the arrangement 1 according to FIG. 1, the voltage supply of the extension card 4 is disconnected at the time of switching into the stand-by state Y. Just like the increase, the drop in the first card voltage $U_{K1}$ is also influenced by the above-described devices to prevent peaks.

According to FIG. 4, the switching signal S is switched to the logical switching state "low" at a time delay relative to the switching of the PS-OFF signal PSOFF, at time $t_6'$. This occurs approximately 500 ms after the PS-OFF signal PSOFF is switched. By time $t_6$, according to FIG. 4, the first card voltage $U_{K1}$ as well as the operating voltage $U_B$ and the second card voltage $U_{K2}$ coupled to the operating voltage $U_B$ have also dropped to zero. As a result, the arrangement 1' according to FIG. 2 also complies with the above-mentioned PCI Express standard in the event of switching from the operating state X into the stand-by state Y. Directly disconnecting the first card voltage $U_{K1}$ in the event of a computer power supply unit 2' of the second type being identified could lead to problems because in this example the second card voltage $U_{K2}$ that follows the operating voltage $U_B$ in the arrangement 1' according to FIG. 2 could deviate from the first card voltage $U_{K1}$ by more than the permitted 1.92 V.

The dynamic switching of the switching elements 10, 10' arranged on the system circuit boards 3, 3', on the basis of the identified type of the computer power supply units 2, 2', makes it possible to use a structurally identical system circuit board 3, 3' in differently designed computer systems, irrespective of whether a computer power supply unit 2, 2' of the first or of the second type is used.

As an alternative to the example shown here in which the sequencing device of a system circuit board 3, 3' is used, it is also possible to use an additional microcontroller or another switching circuit to identify the type of the computer power supply units 2, 2' and control the switching elements 10, 10'.

The invention claimed is:

1. A system circuit board configured to be supplied by at least one power supply unit, with an operating voltage in an operating state and a stand-by voltage in at least one stand-by state, the system circuit board comprising:
   at least one connection device for at least one extension card, wherein the connection device is configured to provide at least one first card voltage on the basis of the operating voltage;
   at least one switching element arranged on the system circuit board and configured to disconnect the at least one connection device from the operating voltage; and
   a control device arranged on the system circuit board, and configured to identify a type of a connected power supply unit and send a switching signal to the switching element depending on the identified type,
   wherein the control device is a sequencing device that sequences voltages provided by the power supply unit,
   the sequencing device is configured to identify the type of the connected power supply unit on the basis of an evaluation of a signal curve of a first control signal and a second control signal, and
   the first control signal indicates that all the voltages provided by the power supply unit are within a specified tolerance and the second control signal signals a switching from the at least one stand-by state to the operating state or vice versa.

2. The system circuit board according to claim 1, wherein the control device is configured to identify a power supply unit that provides the operating voltage and the stand-by voltage at the system circuit board in a synchronized manner as a first type, and identify a power supply unit that provides the operating voltage and the stand-by voltage at the system circuit board in an asynchronous manner as a second type.

3. The system circuit board according to claim 1, wherein the control device is further configured to store the identified type of the power supply unit.

4. A computer system comprising:
   the system circuit board according to claim 1,
   at least one power supply unit to provide the operating voltage and the stand-by voltage, and
   at least one extension card connected to the connection device and configured to be supplied with power by the at least one first card voltage.

5. The computer system according to claim 4, wherein the at least one power supply unit is optionally designed to provide a second card voltage directly at the at least one extension card, and the second card voltage is guided past the system circuit board.

6. The computer system according to claim 5, wherein the at least one power supply unit provides the second card voltage only if the power supply unit comprises a main power supply and an auxiliary power supply.

7. The computer system according to claim 5, wherein the second card voltage is coupled to the operating voltage in the at least one power supply unit.

8. The computer system according to claim 4, wherein the at least one extension card is designed, in accordance with a PCIe standard, to connect peripheral devices to the computer system.

9. A method of operating a system circuit board supplied by at least one power supply unit, with an operating voltage in an operating state and with a stand-by voltage in at least one stand-by state the system circuit board comprising at least one connection device for at least one extension card, at least one switching element arranged on the system circuit board and configured to disconnect the at least one connection device from the operating voltage, and a control device arranged on the system circuit board, the method comprising:
   providing at least one first card voltage on the basis of the operating voltage at the at least one connection device;
   identifying by the control device a type of a connected power supply unit; and sending by the control device a switching signal to the at least one switching element, depending on the identified type,
wherein the control device identifies a power supply unit that provides the operating voltage and the stand-by voltage at the system circuit board in a synchronized manner as a first type, and identifies a power supply unit that provides the operating voltage and the stand-by voltage at the system circuit board in an asynchronous manner as a second type,
the control device sends the switching signal after a first time delay following a switching from the at least one stand-by state into the operating state to close the at least one switching element,
the control device sends the switching signal at a second-time delay, greater than the first time delay following a switch from the operating state into the at least one stand-by state to open the at least one switching element, if a power supply unit of the second type has been identified,
the control device sends the switching signal at a time delay following a switch from the at least one stand-by state into the operating state to close the at least one switching element, and
the control device sends the switching signal immediately following a switch from the operating state into the at least one stand-by state to open the at least one switching element if a power supply unit of the first type has been identified.

* * * * *